United States Patent
Ganesan et al.

(10) Patent No.: US 12,396,028 B2
(45) Date of Patent: Aug. 19, 2025

(54) LISTEN-BEFORE-TALK FOR DISCOVERY REFERENCE SIGNAL TRANSMISSION

(71) Applicant: Lenovo (Singapore) PTE. LTD., New Tech Park (SG)

(72) Inventors: Karthikeyan Ganesan, Kronberg im Taunus (DE); Ankit Bhamri, Rödermark (DE); Ali Ramadan Ali, Kraiburg am Inn (DE); Alexander Johann Maria Golitschek Edler von Elbwart, Darmstadt (DE); Vijay Nangia, Woodridge, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 302 days.

(21) Appl. No.: 17/914,724

(22) PCT Filed: Mar. 24, 2021

(86) PCT No.: PCT/IB2021/052461
§ 371 (c)(1),
(2) Date: Sep. 26, 2022

(87) PCT Pub. No.: WO2021/191828
PCT Pub. Date: Sep. 30, 2021

(65) Prior Publication Data
US 2023/0141702 A1   May 11, 2023

Related U.S. Application Data

(60) Provisional application No. 62/994,236, filed on Mar. 24, 2020.

(30) Foreign Application Priority Data

Jan. 29, 2021 (WO) .................. PCT/IB2021/050693
Mar. 9, 2021 (WO) .................. PCT/IB2021/051966

(51) Int. Cl.
H04W 74/08    (2024.01)
H04B 7/06     (2006.01)
(Continued)

(52) U.S. Cl.
CPC .... H04W 74/0808 (2013.01); H04B 7/06952 (2023.05); H04L 5/0048 (2013.01)

(58) Field of Classification Search
CPC . H04W 74/0808; H04W 16/14; H04W 28/10; H04L 5/0048; H04L 5/001;
(Continued)

(56) References Cited

U.S. PATENT DOCUMENTS

2019/0141744 A1   5/2019   Naghshvar et al.
2019/0230706 A1   7/2019   Li et al.
(Continued)

FOREIGN PATENT DOCUMENTS

WO    2019173365 A1   9/2019
WO    2020033395 A1   2/2020

OTHER PUBLICATIONS

PCT/IB2021/050693, "Notification of Transmittal of the International Search Report and the Written Opinion of the International Searching authority, or the Declaration", International Searching Authority, Apr. 28, 2021, pp. 1-15.
(Continued)

*Primary Examiner* — Kiet Tang
(74) *Attorney, Agent, or Firm* — Kunzler Bean & Adamson

(57) ABSTRACT

Apparatuses, methods, and systems are disclosed for directional LBT procedure for DRS transmission. One apparatus includes a processor and a transceiver that is operable on unlicensed spectrum. The processor indicates block locations within a Discovery Reference Signal ("DRS") transmission window for a plurality of candidate Synchronization
(Continued)

Signal/Physical Broadcast Channel ("SS/PBCH") blocks. The processor performs a Listen-Before-Talk ("LBT") procedure for a plurality of DRS transmissions within a DRS transmission window and controls the transceiver to transmit—for a given spatial direction—a SS/PBCH block upon successful LBT for the given spatial direction.

20 Claims, 11 Drawing Sheets

(51) Int. Cl.
*H04L 5/00* (2006.01)
*H04W 74/0808* (2024.01)

(58) Field of Classification Search
CPC ... H04L 5/0023; H04L 5/0032; H04L 5/0053; H04L 5/0087; H04L 5/0091; H04B 7/0626; H04B 7/0695; H04B 7/088
See application file for complete search history.

(56) References Cited

U.S. PATENT DOCUMENTS

| | | | |
|---|---|---|---|
| 2020/0053637 A1* | 2/2020 | Tsai | H04W 48/16 |
| 2020/0053670 A1* | 2/2020 | Jung | H04W 56/0015 |
| 2020/0053779 A1 | 2/2020 | Jeon et al. | |
| 2020/0053781 A1 | 2/2020 | Pan et al. | |
| 2020/0177318 A1 | 6/2020 | Belleschi et al. | |
| 2020/0259621 A1 | 8/2020 | Oh et al. | |
| 2020/0267736 A1 | 8/2020 | Hafeez et al. | |
| 2020/0280859 A1 | 9/2020 | Kim et al. | |
| 2021/0029730 A1 | 1/2021 | Lou et al. | |
| 2021/0029768 A1* | 1/2021 | Shih | H04W 74/0833 |
| 2021/0076424 A1 | 3/2021 | Mukherjee et al. | |
| 2022/0015118 A1 | 1/2022 | Park et al. | |
| 2022/0287093 A1 | 9/2022 | Iyer et al. | |
| 2022/0377810 A1 | 11/2022 | Bhamri et al. | |
| 2022/0408488 A1 | 12/2022 | Deghel et al. | |
| 2023/0009559 A1 | 1/2023 | Wang | |
| 2023/0155659 A1 | 5/2023 | Ganesan et al. | |

OTHER PUBLICATIONS

PCT/IB2021/051966, "Notification of Transmittal of the International Search Report and the Written Opinion of the International Searching authority, or the Declaration", International Searching Authority, Aug. 6, 2021, pp. 1-17.
Vivo, "Potential solutions and techniques for NR unlicensed spectrum", 3GPP TSG RAN WG1 Meeting #92 R1-1801557, Feb. 26-Mar. 2, 2018, pp. 1-6.
Panasonic, "Discussion on resource allocation mechanism of mode 2 in NR V2X", 3GPP TSG RAN WG1 #97 R1-1906403, May 13-17, 2019, pp. 1-3.
InterDigital, "Handling UL LBT Failures in MAC", 3GPP RAN WG2 Meeting #106 R2-1906403, May 13-17, 2019, pp. 1-3.
3GPP, "3rd Generation Partnership Project; Technical Specification Group Radio Access Network; NR; User Equipment (UE) radio access capabilities (Release 15)", 3GPP TS 38.306 V15.8.0, Dec. 2019, pp. 1-60.
3GPP, "3rd Generation Partnership Project; Technical Specification Group Radio Access Network; NR; Medium Access Control (MAC) protocol specification (Release 15)", 3GPP TS 38.321 V15.8.0, Dec. 2019, pp. 1-78.
3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.
M. Smith, "Office Action Summary", USPTO, Sep. 29, 2024, pp. 1-25.
PCT/IB2021/052461, "Notification of Transmittal of the International Search Report and the Written Opinion of the International Searching authority, or the Declaration", International Searching Authority, Jun. 29, 2021, pp. 1-15.
Intel Corporation, "Enhancements to NR DL signals and channels for unlicensed operation", 3GPP TSG RAN WG1 Meeting #95 R1-1812480, Nov. 12-16, 2018, p. 1-12.
ZTE,SaneChips, "Considerations on initial access signals and channels for NR-U", c3GPP TSG RAN WG1 Meeting #97 R1-1905948, May 13-17, 2019, pp. 1-15.
Intel Corporation, "New SID: Study on supporting NR from 52.6GHz to 71 GHz", 3GPP TSG RAN Meeting #86 RP-193259, Dec. 9-12, 2019, pp. 1-3.
3GPP, "3rd Generation Partnership Project; Technical Specification Group Radio Access Network; NR; User Equipment (UE) radio transmission and reception; Part 1: Range 1 Standalone (Release 16)", 3GPP TS 38.101-1 V16.2.0, Dec. 2019, pp. 1-310.
3GPP, "3rd Generation Partnership Project; Technical Specification Group Radio Access Network; NR; User Equipment (UE) radio transmission and reception; Part 2: Range 2 Standalone (Release 16)", 3GPP TS 38.101-2 V16.2.0, Dec. 2019, pp. 1-157.
3GPP, "3rd Generation Partnership Project; Technical Specification Group Radio Access Network; NR; Base Station (BS) radio transmission and reception (Release 16)", 3GPP TS 38.104 V16.2.0, Dec. 2019, pp. 1-239.
3GPP, "3rd Generation Partnership Project; Technical Specification Group Radio Access Network; NR; Physical channels and modulation (Release 16)", 3GPP TS 38.211 V16.0.0, Dec. 2019, pp. 1-129.
3GPP, "3rd Generation Partnership Project; Technical Specification Group Radio Access Network; NR; Multiplexing and channel coding (Release 15)", 3GPP TS 38.212 V15.8.0, Dec. 2019, pp. 1-101.
3GPP, 3rd Generation Partnership Project; Technical Specification Group Radio Access Network; NR; Physical layer procedures for data (Release 16), 3GPP TS 38.214 V16.0.0, Dec. 2019, p. 1-147.
ZTE, SaneChips, "Discussion on enhancement of initial access procedures for NR-U", 3GPP TSG RAN WG1 Meeting #96bis R1-1903874, Apr. 8-12, 2019, pp. 1-12.
U.S. Appl. No. 17/759,566, "Office Action Summary", USPTO, Jan. 13, 2025, pp. 1-24.
U.S. Appl. No. 17/910,321, "Office Action Summary", United States Patent and Trademark Office, Apr. 24, 2025, pp. 1-22.
U.S. Appl. No. 17/759,566, "Office Action Summary", United States Patent and Trademark Office, May 20, 2025, pp. 1-17.
3GPP, "3rd Generation Partnership Project; Technical Specification Group Radio Access Network; Physical layer procedures for shared spectrum channel access (Release 16)", 3GPP TS 37.213 V16.0.0, Dec. 2019, pp. 1-25.

* cited by examiner

LISTEN-BEFORE-TALK FOR DISCOVERY REFERENCE SIGNAL TRANSMISSION

CROSS-REFERENCE TO RELATED APPLICATIONS

This application claims priority to U.S. Provisional Patent Application No. 62/994,236 entitled "DIRECTIONAL LBT PROCEDURE FOR DRS TRANSMISSION" and filed on Mar. 24, 2020 for Karthikeyan Ganesan, Ankit Bhamri, Ali Ramadan Ali, Alexander Johann Maria Golitschek Edler von Elbwart, and Vijay Nangia, which application is incorporated herein by reference. This application also claims priority to International Patent Application PCT/IB2021/051966 entitled "BEAM SWITCHING AFTER PERFORMING LISTEN-BEFORE-TALK" and filed on Mar. 9, 2021 for Karthikeyan Ganesan, Ankit Bhamri, and Ali Ramadan Ali, which application claims priority to International Patent Application PCT/IB2021/050693 entitled "PERFORMING A LISTEN-BEFORE-TALK ON BEAMS AND?OR PANELS" and filed on Jan. 29, 2021 for Ankit Bhamri, Ali Ramadan Ali, Alexander Johann Maria Golitschek Edler von Elbwart, Karthikeyan Ganesan, and Joachim L6 hr, which applications are incorporated herein by reference.

FIELD

The subject matter disclosed herein relates generally to wireless communications and more particularly relates to directional Discovery Reference Signal ("DRS") transmission after Listen-Before-Talk ("LBT").

BACKGROUND

In certain wireless communication systems, service is supplemented by operation on unlicensed spectrum. However, operation on unlicensed spectrum requires Clear Channel Assessment ("CCA") prior to transmission, for example involving a LBT procedure.

In Third generation Partnership Project ("3GPP") New Radio in Unlicensed Spectrum ("NR-U"), channel access in both downlink ("DL") and uplink ("UL") relies on the CCA (e.g., LBT procedure) to gain channel access. Prior to any transmission, the gNB (i.e., 5th generation ("5G") base station) and/or the User Equipment ("UE") must first sense the channel to find out whether there are ongoing communications on the channel. No beamforming is considered for LBT in NR-U in Release 16 ("Rel-16") and only omnidirectional LBT is assumed.

Moreover, in Licensed Assisted Access ("LAA") systems, DRS transmission is utilized in LAA for cell detection, synchronization, and radio resource management ("RRM") measurement.

BRIEF SUMMARY

Disclosed are procedures for directional LBT procedure for DRS transmission. Said procedures may be implemented by apparatus, systems, methods, or computer program products.

One method of a Radio Access Network ("RAN") node includes indicating block locations within a Discovery Reference Signal ("DRS") transmission window for a plurality of candidate Synchronization Signal/Physical Broadcast Channel ("SS/PBCH") blocks. The method includes performing a Listen-Before-Talk ("LBT") procedure for a plurality of DRS transmissions within a DRS transmission window and transmitting—for a given spatial direction—a SS/PBCH block upon successful LBT for the given spatial direction.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
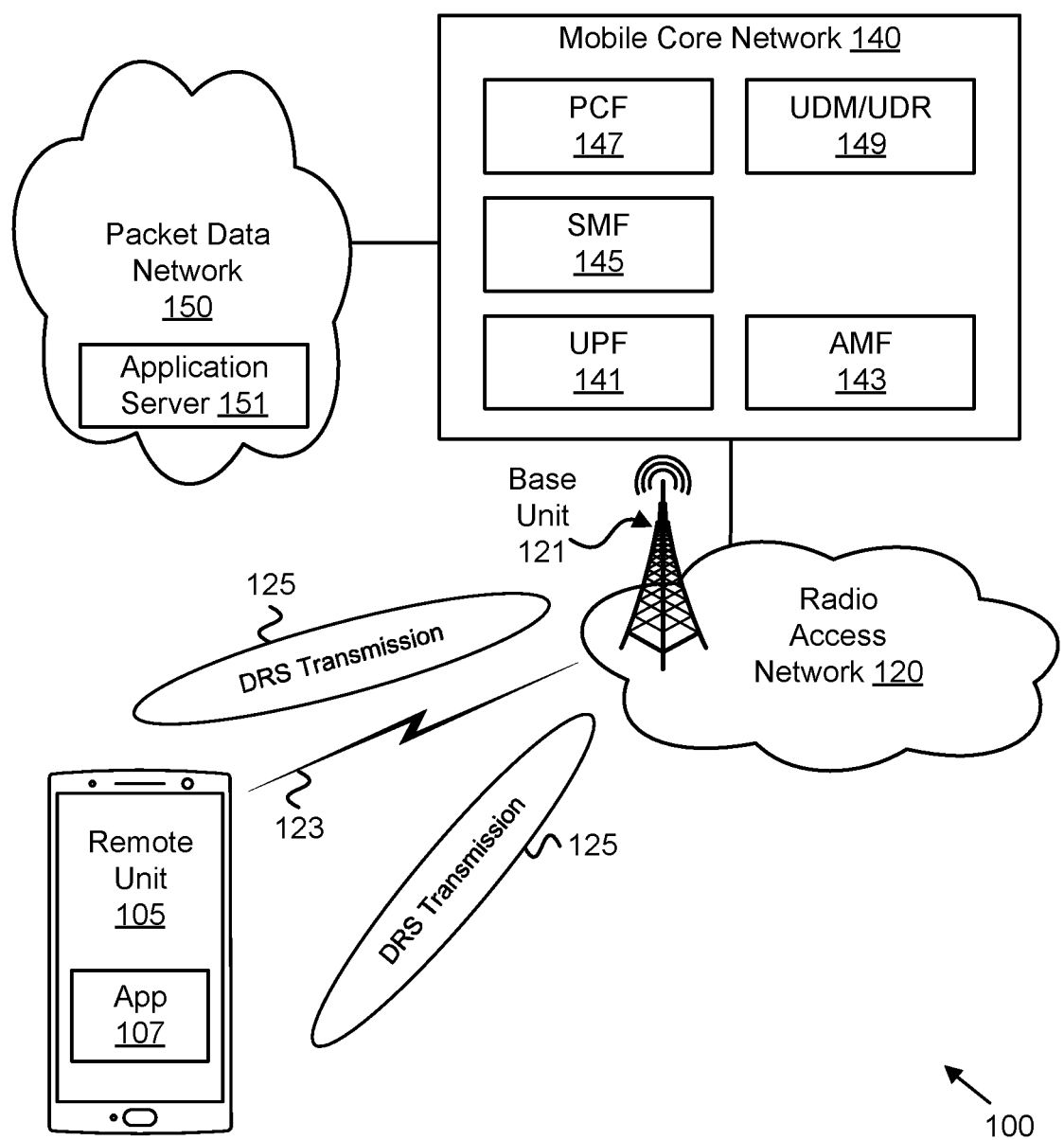
FIG. 1 is a schematic block diagram illustrating one embodiment of a wireless communication system for directional LBT procedure for DRS transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for listen-before-talk ("LBT") procedure for a Discovery Reference Signal ("DRS") transmission window. The present disclosure deals with the channel access mechanism in unlicensed band for high frequency range—namely, Frequency Range #2 ("FR2", i.e., including includes frequency bands from 24.25 GHz to 52.6 GHz) and beyond. More specifically, as beam-based operation is assumed for unlicensed spectrum in FR2 and beyond, it is crucial to perform LBT in a specific beam direction(s) rather than omni-directional LBT.

The present disclosure describes the RAN Node (base station) performing plurality of directional/spatial LBT channel access procedure within DRS transmission window. In some embodiments, the multiple directional/spatial LBT procedures are performed at different time instant where each directional/spatial LBT channel access procedure is performed prior to the SSB/DRS transmission. In other embodiments, the multiple directional/spatial LBT procedures are performed at the same time instant prior to the SSB/DRS transmission.

In certain embodiments, the channel occupancy duration of the each directional LBT channel access is less than or equal to the DRS transmission window. In certain embodiments, the channel occupancy duration of the each directional LBT channel access is based on the number of Quasi-Co-Located ("QCL'ed") Synchronization Signal/Physical Broadcast Channel ("SS/PBCH") block transmission to be performed in each spatial direction within the same or across DRS transmission period.

In certain embodiments, the SS/PBCH block (also referred to as "SSB") is not transmitted in a particular spatial direction or candidate location within the DRS transmission period where LBT fails and the SSB can be transmitted in a previous successful spatial direction where LBT was success. In certain embodiments, the LBT can be skipped in a DRS transmission period based on a statistical information on LBT success/failure calculated in previous DRS transmission periods.

The channel access mechanism for current DRS design performs omni-directional LBT during the DRS transmission window and transmit SS/PBCH, CORESET 0 once LBT is successful. The present disclosure describes directional LBT procedure for DRS transmissions where DRS transmission includes SS/PBCH Block, CORESET 0 and optionally CSI-RS. Control Resource Set ("CORESET") 0 (also referred to as "Type 0 PDCCH Common Search Space ("CSS")) is a subset of NR PDCCH Search Space that is dedicated to transmit the PDCCH for SI message (e.g., system information block ("SIB")).

In NR-U, channel access in both downlink and uplink relies on the LBT; however, no beamforming is considered for LBT in NR-U in Rel-16 and only omni-directional LBT is assumed. The NR-U LBT procedures for channel access can be summarized as follows:

A) Both gNB-initiated and UE-initiated Channel Occupant Times ("COTs") use Category 4 ("Cat-4") LBT where the start of a new transmission burst always perform LBT with exponential back-off. Only with exception, when the DRS must be at most one ms in duration and is not multiplexed with unicast PDSCH. As used herein, a Cat-4 LBT procedure refers to LBT with a random back-off and with a variable size contention window.

B) UL transmission within a gNB initiated Channel Occupancy Time ("COT") or a subsequent DL transmission within a UE or gNB initiated COT can transmit immediately without sensing only if the gap from the end of the previous transmission is not more than 16 μs, otherwise Category 2 ("Cat-2") LBT must be used and the gap cannot exceed 25 μs. As used herein, a Cat-2 LBT procedure refers to LBT without random back-off.

FIG. 1 depicts a wireless communication system 100 for directional LBT procedure for DRS transmission, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140. As described in greater detail below, the remote unit 105 may send channel test information 111 to the remote unit 105, wherein the RAN 120 sends a feedback information 113 to the remote unit 105.

In some embodiments, the remote units 105 communicate with an application server 151 via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. Each mobile core network 140 belongs to a single PLMN. The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the RAN 120, a Session Management Function ("SMF") 145, a Policy Control Function ("PCF") 147, and a Unified Data Management function ("UDM"). In some embodiments, the UDM is co-located with a User Data Repository ("UDR"), depicted as combined entity "UDM/UDR" 149. In various embodiments, the mobile core network 140 may also include an Authentication Server Function ("AUSF"), a Network Repository Function ("NRF") (used by the various NFs to discover and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single-network slice selection assistance information ("S-NSSAI") while a set of network slices for which the remote unit 105 is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

While FIG. 1 depicts components of a 5G RAN and a 5G core network, the described embodiments for directional LBT procedure for DRS transmission apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

The base unit 121 is configured with multiple transmit ("Tx") panels. As used herein, a "Tx panel" (also referred to as gNB panel) refers to a logical entity that may be mapped to physical antennas of the base unit 121. Depending on implementation, a Tx panel can have at least the functionality as an operational role of Unit of antenna group to control its Tx beam independently. Note that a base unit 121 may also be configured with multiple receive ("Rx") panels, i.e., logical entities that may be mapped to physical antennas of the remote unit 105 used to directionally receive a signal from the base unit 121.

According to a first solution, the base unit 121 performs directional LBT at a different time instant for every DRS transmission. According to a second solution, the base unit 121 perform plurality of directional LBT at the same time (e.g., in parallel) prior to the beginning of the COT where actual transmission of DRS is to occur. According to a third solution, the base unit 121 may perform autonomous update of QCL assumption for certain SSBs based on LBT failure.

In the following descriptions, the term "RAN node" is used for the base station but it is replaceable by any other radio access node, e.g., gNB, eNB, Base Station ("BS"), Access Point ("AP"), etc. Further, the operations are described mainly in the context of 5G NR. However, the proposed solutions/methods are also equally applicable to other mobile communication systems supporting measurement reporting in non-public networks.

Figure 2:
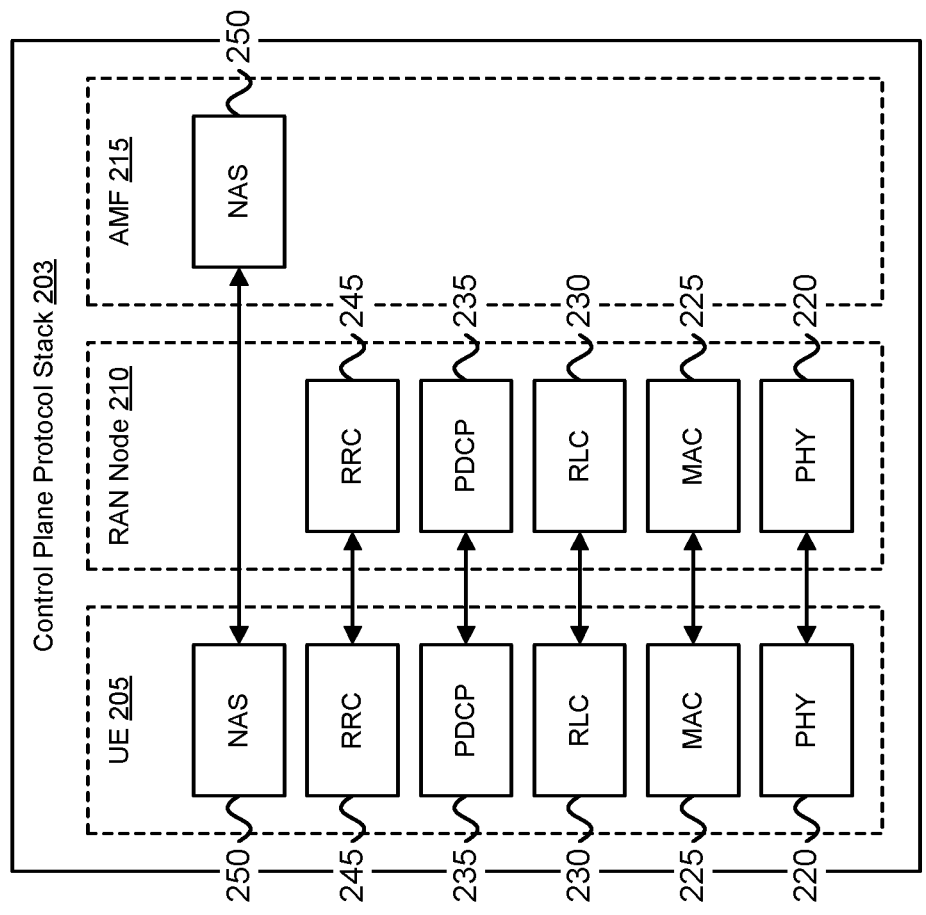
FIG. 2 is a block diagram illustrating one embodiment of a 5G New Radio ("NR") protocol stack.
Figure 2:
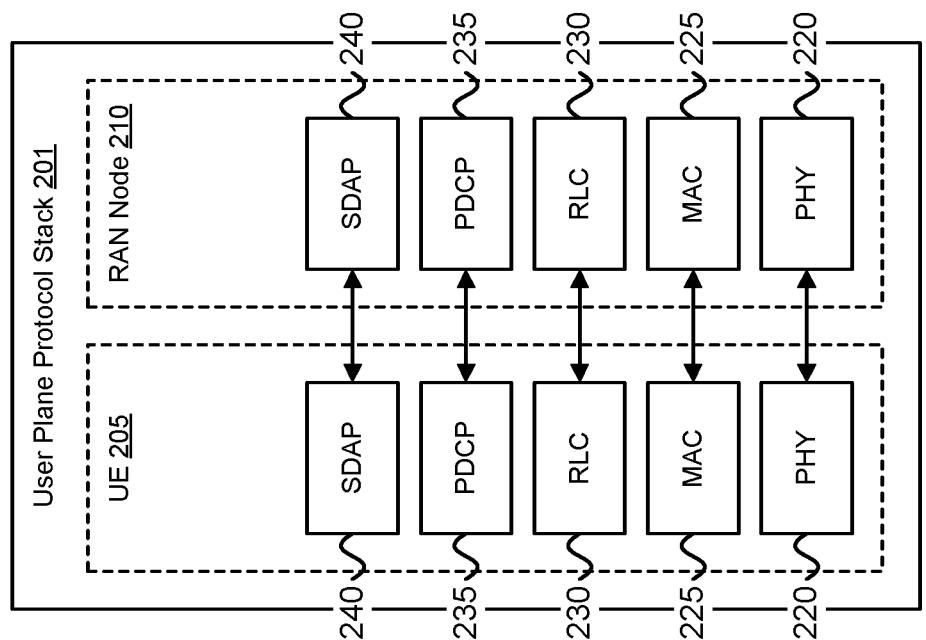

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and Service Data Adaptation Protocol ("SDAP") layer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") layer 245 and a Non-Access Stratum ("NAS") layer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform CCA/LBT procedure using energy detection thresholds, as described herein. In certain embodiments, the physical layer 220 may send a notification of UL LBT failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (i.e., RAN node 210) and carries information over the wireless portion of the network.

Cell search is the procedure for a UE to acquire time and frequency synchronization with a cell and to detect the physical layer Cell ID of the cell. A UE receives the following synchronization signals ("SS") in order to perform cell search: the primary synchronization signal ("PSS") and secondary synchronization signal ("SSS").

A UE assumes that reception occasions of a physical broadcast channel ("PBCH"), PSS, and SSS are in consecutive symbols and form a SS/PBCH block. The UE assumes that SSS, PBCH Demodulation Reference Signal ("DM-RS"), and PBCH data have same Energy Per Resource Element ("EPRE"). The UE may assume that the ratio of PSS EPRE to SSS EPRE in a SS/PBCH block is either 0 dB or 3 dB. If the UE has not been provided dedicated higher layer parameters, the UE may assume that the ratio of PDCCH DM-RS EPRE to SSS EPRE is within −8 dB and 8 dB when the UE monitors PDCCHs for a Downlink Control Information ("DCI") format 1_0 with Cyclic Redundancy Check ("CRC") scrambled by System Information Radio Network Temporary Identifier ("SI-RNTI," used for transmission of SIB messages), Paging Radio Network Temporary Identifier ("P-RNTI," used for paging message), or Random Access Radio Network Temporary Identifier ("RA-RNTI," used for PRACH response message).

For operation with shared spectrum channel access, a UE assumes that transmission of SS/PBCH blocks in a half frame is within a discovery burst transmission window that starts from the first symbol of the first slot in a half-frame. The UE can be provided per serving cell by DiscoveryBurstWindowLength-r16 a duration of the discovery burst transmission window. If DiscoveryBurst-WindowLength-r16 is not provided, the UE assumes that the duration of the discovery burst transmission window is a half frame. For a serving cell, the UE assumes that a periodicity of the discovery burst transmission window is same as a periodicity of half frames for receptions of SS/PBCH blocks in the serving cell. The UE assumes that one or more SS/PBCH blocks indicated by ssb-PositionsInBurst may be transmitted within the discovery burst transmission window and have candidate SS/PBCH blocks indexes corresponding to SS/PBCH block indexes provided by ssb-PositionsInBurst. If the Most Significant Bit ("MSB") k, k≥1, of ssb-PositionsInBurst is set to 1, the UE assumes that one or more SS/PBCH blocks within the discovery burst transmission window with candidate SS/PBCH block indexes corresponding to SS/PBCH block index equal to k−1 may be transmitted; if MSB k is set to 0, the UE assumes that the SS/PBCH block(s) are not transmitted.

For operation with shared spectrum channel access, a UE assumes that SS/PBCH blocks in a serving cell that are within a same discovery burst transmission window or across discovery burst transmission windows are quasi co-located with respect to average gain, QCL-TypeA, and QCL-TypeD properties, when applicable, if a value of $(N_{DM-RS}^{PBCH} \bmod N_{SSB}^{QCL})$ is same among the SS/PBCH blocks. $N_{DM-RS}^{PBCH}$ is an index of a DM-RS sequence transmitted in a PBCH of a corresponding SS/PBCH block, and NQ is either provided by ssbPositionQCL-Relationship-r16 or, if ssbPositionQCL-Relationship-r16 is not provided, obtained from a master information block ("MIB") provided by a SS/PBCH block. The parameter ssbSubcarrierSpacing-Common indicates Subcarrier Spacing ("SCS") of Remaining Minimum System Information ("RMSI") only for the case of "operation without shared spectrum." The UE assumes that within a discovery burst transmission window, a number of transmitted SS/PBCH blocks on a serving cell is not larger than $N_{SSB}^{QCL}$. The UE can determine an SS/PBCH block index according to $(N_{DM-RS}^{PBCH} \bmod N_{SSB}^{QCL})$ or according to (ī mod $N_{SSB}^{QCL}$) where ī is the candidate SS/PBCH block index.

Figure 3A:
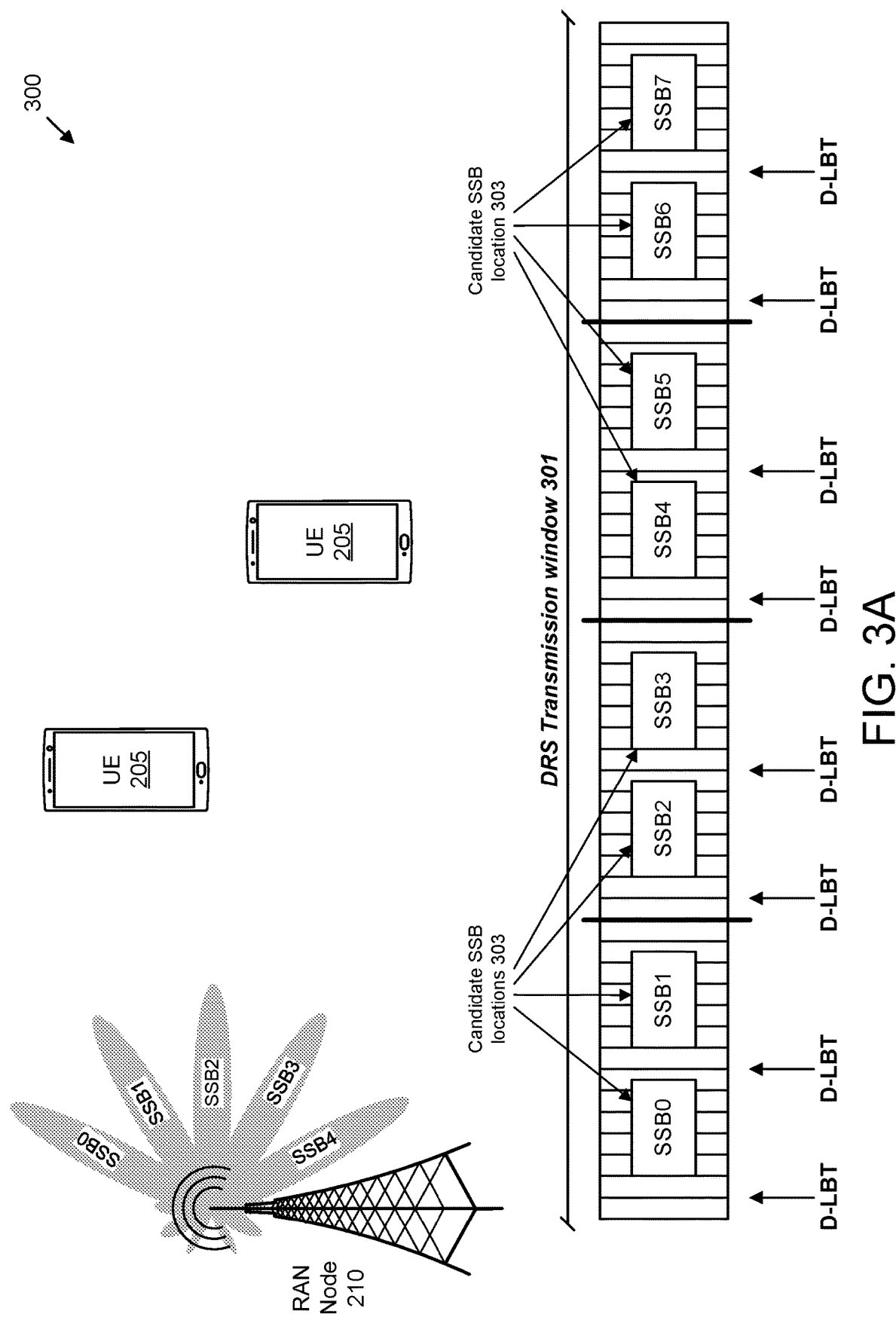
FIG. 3A is a diagram illustrating one embodiment of a LBT procedure for a DRS transmission window.
Figure 3B:
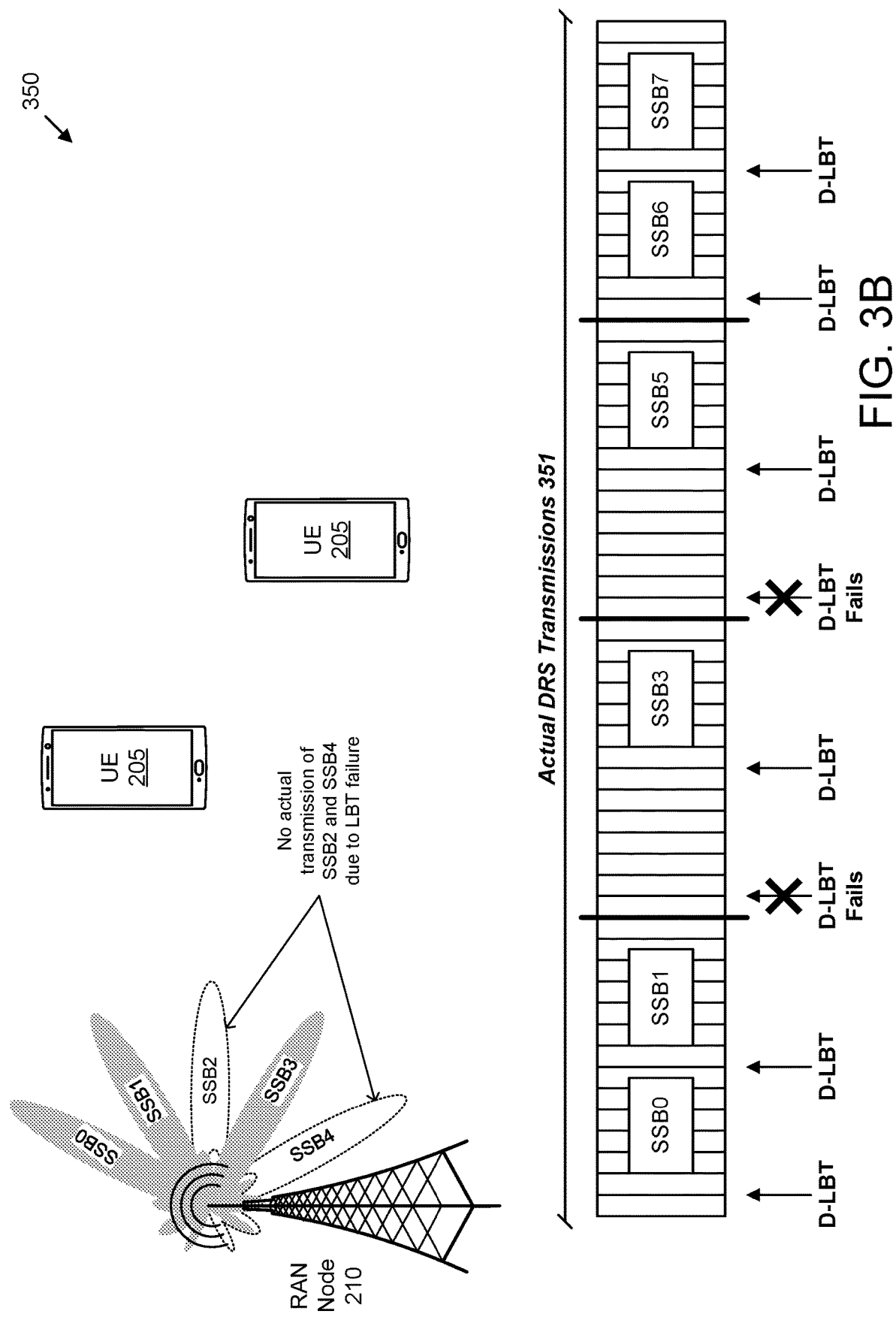
FIG. 3B is a diagram illustrating one embodiment of a procedure for handling LBT failure during a DRS transmission window.

FIG. 3A is a diagram illustrating one embodiment of a LBT procedure for a DRS transmission window. FIG. 3B is a diagram illustrating one embodiment of a procedure for handling LBT failure during a DRS transmission window. FIGS. 3A-3B depict examples of a first solution for LBT procedure for a DRS transmission window.

According to the first solution, directional LBT ("D-LBT") is performed on each sensing beam at a different time instant for every DRS transmission, e.g., prior to the DRS transmission in the corresponding transmission beam. Here, the RAN node 210 may perform plurality of directional LBT procedures on a sensing beam at different time instants prior to the actual transmission of beam-swept transmission of, e.g., SS/PBCH Block, CORESET 0, CSI-RS in the DRS transmission period or within the DRS/discovery burst transmission window 301. In one example, the directional LBT is performed at each candidate SS/PBCH block location prior to actual SS/PBCH/CORESET 0 transmission.

In various embodiments of the first solution, the timing of each directional LBT is based on the candidate SS/PBCH block locations 303, shown in FIG. 3A. The location of a candidate SS/PBCH block is determined based on a bitmap signaled in the parameter ssb-PositionsInBurst. Note that System Information Block 1 ("SIB1") may carry the parameter ssb-PositionsInBurst which tells about time domain position of SS/PBCH Block in the SS Burst.

FIG. 3B depicts a scenario 350 showing actual DRS transmission 351, according to embodiments of the disclosure. As described above, in the first solution the RAN node 210 performs directional LBT prior to each SS/PBCH block (also referred to as "SSB") transmission. For a given spatial direction, when LBT is successful SSB is transmitted based on the bitmap signaled in the ssb-PositionsInBurst. Accordingly, the SSB is not transmitted in a particular spatial direction or candidate location within the DRS transmission period where LBT fails. In the depicted example, LBT fails prior to the candidate location for SSB2 and also for SSB4. Consequently, there is no actual transmission of SSB2 and SSB4 due to LBT failure in the respective spatial directions. However, in the depicted example there is actual transmission of SSB0, SSB1, SSB3, SSB5, SSB6 and SSB7, due to successful LBT prior to the candidate locations for these SSBs.

In some embodiments, the channel occupancy time ("COT") or Maximum COT ("MCOT") for each of this directional LBT procedure performed by the RAN node 210 may be equal to or less than the configured DRS transmission duration. The RAN node 210 may also choose MCOT for each directional LBT channel access procedure based on the number of configured Quasi-Co-Located ("QCL'ed") SS/PBCH Block transmission (e.g., quasi co-located with respect to average gain, QCL-TypeA, and QCL-TypeD properties) needed to be performed from the same spatial beam/gNB panel/antenna port within or across the DRS transmission window. In one example, the MCOT may be selected based on (e.g., time duration span of) the number of transmitted SS/PBCH Blocks, the value of NQs or the number of candidate SS/PBCH Block within the DRS/discovery burst transmission window.

In the remaining channel occupancy period for each of the beam/panel during the directional LBT, the RAN node 210 may perform data transmission to other connected UEs using shared COT principles and priority value for the channel access may be based on DRS.

In one implementation of the above embodiment, the RAN node 210 may configure the DRS transmission duration to 5 ms, bitmap signaled in ssb-PositionsInBurst are all One's and Quasi-Co-Location ("QCL") parameter value as 8. In this case, the RAN node 210 may perform plurality of directional LBT at different time instant prior to the actual transmission of DRS from that beam/panel/port where for each of the directional LBT procedure the RAN node 210 may reserve the channel for 0.5 ms for DRS transmission. In another implementation, the RAN node 210 may reserve the channel for all QCL'ed SS/PBCH Block transmission within or across the DRS transmission window using the same beam/panel/port and the remaining COT may be used for data transmission.

Figure 4A:
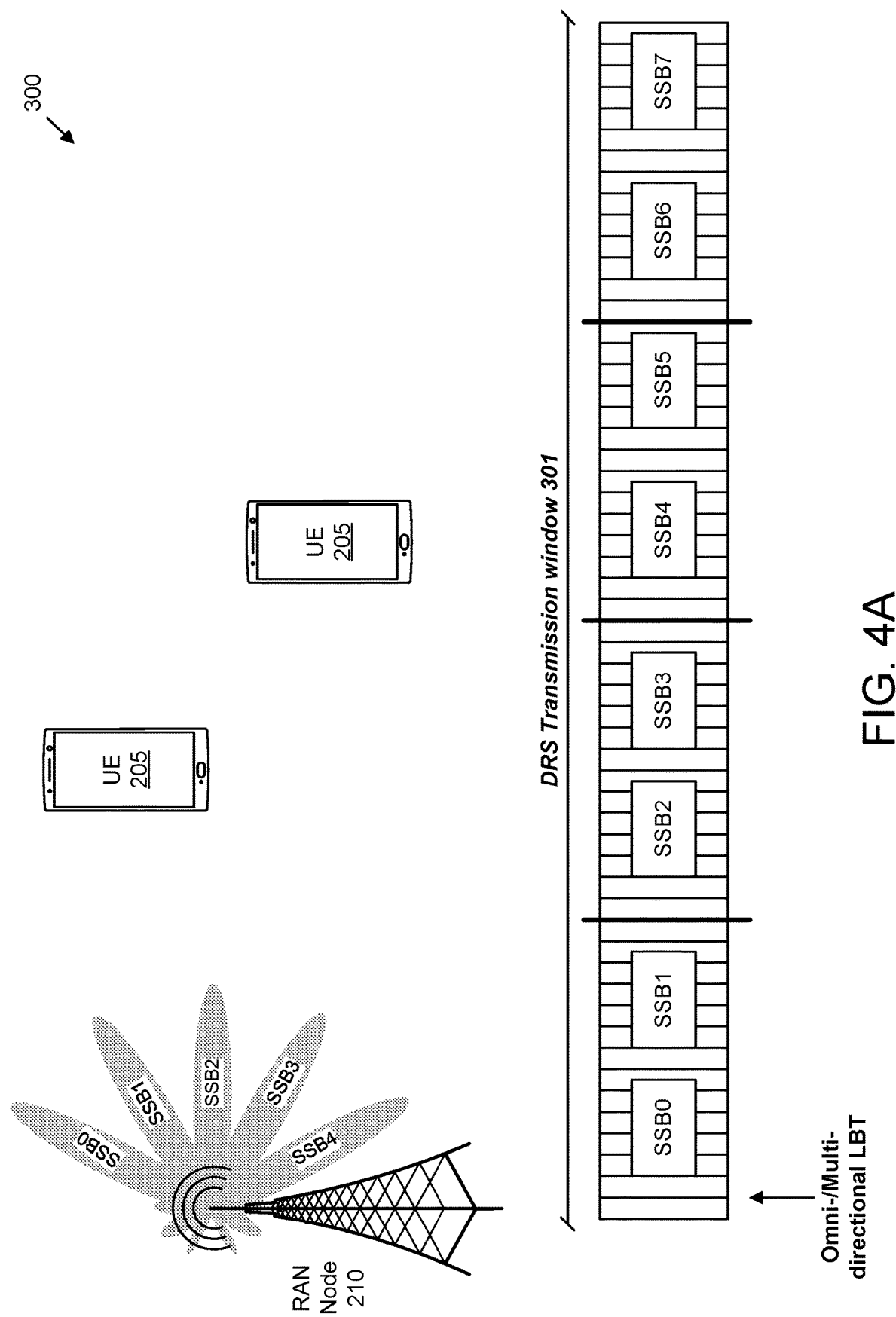
FIG. 4A is a diagram illustrating one embodiment of LBT procedure for DRS transmission.
Figure 4B:
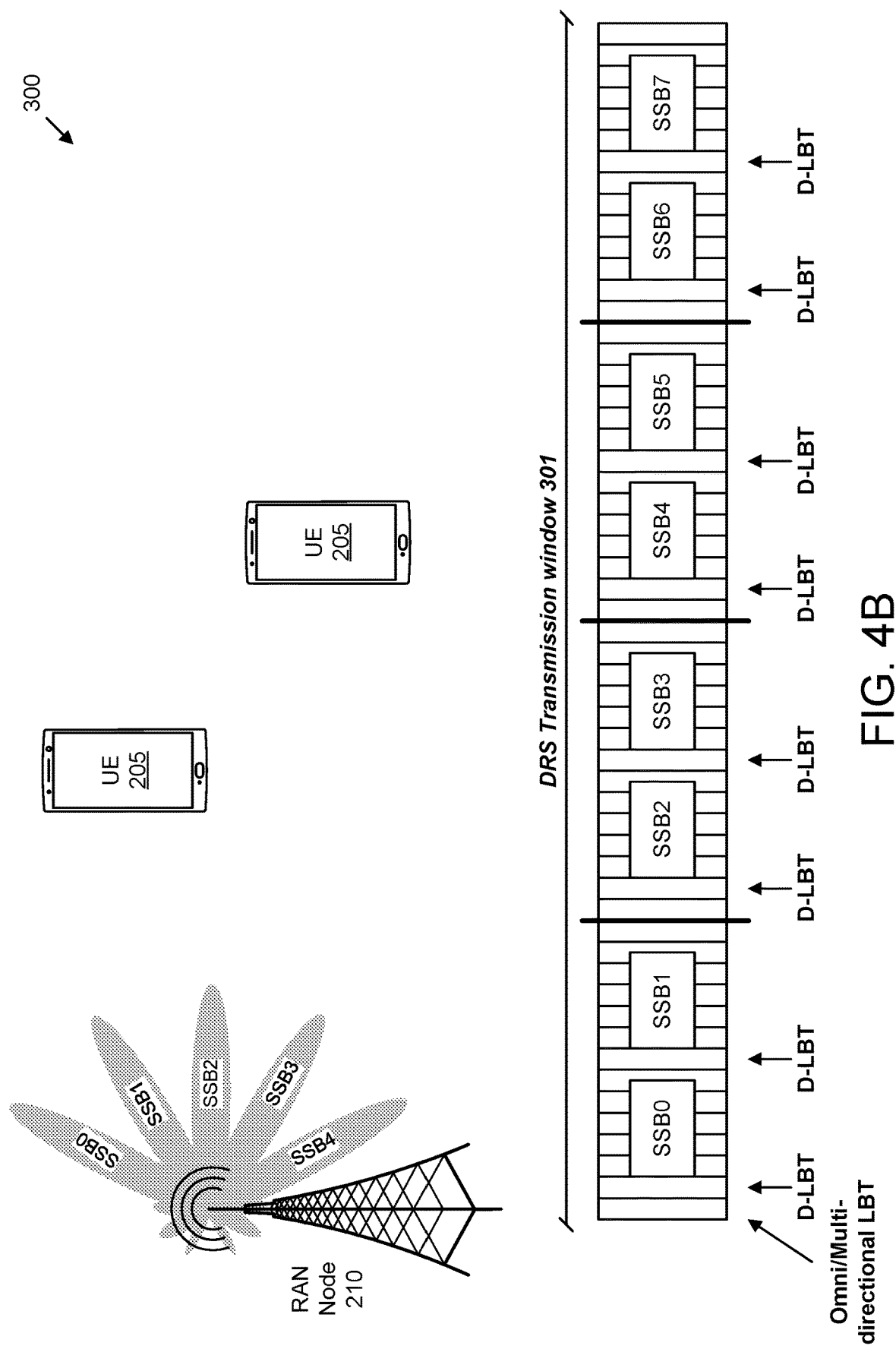
FIG. 4B is a diagram illustrating another embodiment of LBT procedure for DRS transmission.

FIGS. 4A-4B are diagrams illustrating additional embodiments of LBT procedure for a DRS transmission window. In FIG. 4A the RAN node 210 performs LBT is a plurality of directions (i.e., using omni-directional LBT or simultaneously performing multiple directional ("multi-directional") LBT procedures. In FIG. 4B, the RAN node 210 additional performs directional LBT prior to SSB transmission. FIGS. 4A and 4B depicts examples of a second solution for LBT procedure for a DRS transmission window.

According to the second solution, the RAN node 210 may perform plurality of directional LBT on each sensing beams at the same time (e.g., in parallel using multiple antenna subarrays/panels/Radio Frequency ("RF") chains) prior to the beginning of the COT where actual transmission of beam-swept transmission of SS/PBCH Block, CORESET 0, CSI-RS within DRS transmission window and the actual transmission is based on the bitmap signaled in ssb-PositionsInBurst. For example, the RAN node 210 may use multiple, independent per-beam LBT sensing at the start of COT is performed for all beams to be used in the COT with appropriate energy detection threshold. In certain embodiments, the remaining channel occupancy time is shared with UE for the data transmission and the channel access priority value is chosen according to that of DRS.

FIG. 4A depicts one embodiment of the second solution where the RAN node 210 performs LBT in all (or a plurality of) spatial directions and occupies the channel in the spatial directions for the same time duration (i.e., same COT) prior to the transmission of SS/PBCH block. For a given spatial direction, when LBT is successful then the RAN node 210 transmits SS/PBCH block based on the bitmap signaled in the ssb-PositionsInBurst. In certain embodiments, the RAN node 210 performs a Cat-4 LBT in all (or a plurality of) spatial directions.

FIG. 4B depicts another embodiment of the second solution where the RAN node 210 performs LBT on a sensing beam in all (or a plurality of) spatial directions (or omni-direction) and occupies the channel in the spatial direction for the same time duration. In certain embodiments, the RAN node 210 performs a Cat-4 LBT on a sensing beam in all (or a plurality of) spatial directions (or omni-direction). For example, the RAN node 210 may use a single LBT sensing with a wide beam that covers all beams to be used in the COT with appropriate energy detection threshold. Alternatively, the RAN node 210 may perform multiple, independent per-beam LBT sensing at the start of COT is performed for all beams to be used in the COT with appropriate energy detection threshold. Additionally, prior to the actual transmission of SS/PBCH block in that spatial direction and time instant (e.g., based on the bitmap signaled in the ssb-PositionsInBurst), the RAN node 210 may perform an additional, directional LBT. In certain embodiments, this directional LBT procedure is a Cat-2 LBT. In some embodiments, the plurality of LBT on each sensing beam may be performed Time-Division Multiplexing ("TDM") or Spatial-Division Multiplexing ("SDM") at the start of the COT. Note that for TDM, the LBT procedure performed in TDM manner, i.e., in each symbol or slot. In contrast, for SDM (i.e., Multi-User Multiple Input, Multiple Output ("MU-MIMO") the LBT procedure is performed simultaneously in different spatial directions at the same time.

In some embodiment, LBT procedure described for DRS may also be applicable for PUSCH transmission.

According to a third solution, autonomous update of Quasi-Co-Location ("QCL") assumption may be performed for certain SSBs based on LBT failure. Here, the RAN node 210 may perform plurality of directional LBT procedures at different time instant prior to the actual transmission of beam-swept transmission of SS/PBCH Block, CORESET 0, CSI-RS in the DRS transmission window and the actual transmission is based on the bitmap signaled in ssb-PositionsInBurst. If there is a directional LBT failure before transmitting a certain spatial SSB (e.g., candidate SSB (SS/PBCH block) transmission direction in the spatial direction in which LBT is performed), then instead of not transmitting the current spatial SSB, the SSB transmission is done, but with a different QCL/spatial beam.

In one implementation of third solution, the updated QCL/spatial beam is same as that of the last/latest successful SSB transmission, provided the timeline requirements from beam switching (e.g., from the beam on which LBT is performed to the beam used for the last successful SSB transmission) and channel occupancy time for the last successful SSB transmission is valid and met. This can be inferred as repetition in the same direction from UE's perspective.

In another implementation of the third solution, the LBT can be skipped before a certain SSB transmission, when the assigned QCL/spatial beam for that particular SSB transmission encountered LBT failure in one of the previous instances within the DRS transmission window. In this case, the SSB transmission is done straightaway with the latest successful QCL/spatial beam within the DRS transmission window.

In one implementation of third solution, the PBCH DM-RS sequence index ($N_{DM-RS}^{PBCH}$) is updated to match the QCL assumption in a spatial direction to have the same value as the PBCH DM-RS sequence index or same SSB index as the latest successful spatial SSB transmission within the current DRS transmission window when a directional LBT for a candidate beam fails at a candidate SS/PBCH block transmission instance. In one example, the SS/PBCH block index is determined based on the PBCH DM-RS index (e.g., according to ($N_{DM-RS}^{PBCH}$ mod $N_{SSB}^{QCL}$)) without considering the value of the candidate SS/PBCH block index.

In another implementation of the third solution, if there is an LBT failure before the transmission of certain SSB beam, then that particular SSB transmission is skipped and instead LBT is performed for the next SSB beam. Upon successful LBT, the corresponding SSB transmission is made on the current set of resources, provided the timeline requirements can be fulfilled.

In one example, the RAN node 210 may perform a plurality of directional LBT at the same time (i.e., in parallel) at the beginning of the COT, e.g., in a first spatial directional LBT and a second spatial directional LBT, and upon LBT failure for the first spatial directional/beam and LBT success for the second spatial direction beam, the RAN 210 transmits a SSB with the second spatial direction beam. In one case, the first spatial directional LBT has higher priority than the second spatial directional LBT for the SS/PBCH block transmission instance, wherein the RAN node 210 transmits a SSB with the first spatial beam when the first spatial directional LBT is successful (e.g., the highest priority beam for which directional LBT is successful) irrespective of the LBT outcome of the second spatial directional LBT (e.g., irrespective of the outcome of the lower priority directional LBT).

In one embodiment of third solution, the outcome of a directional LBT is based on whether a LBT is successful in a plurality of spatial directions including the direction of interest (e.g., directions/beams adjacent to the direction of interest; using beams with broader beamwidth than the beam used for data transmission). In one example, to resolve any hidden-node issues, the transmitter and receiver perform directional LBT and an RTS-CTS (Request To Send—Clear To Send)-like handshake prior to data transmissions possibly using shared COT principles.

Figure 5:
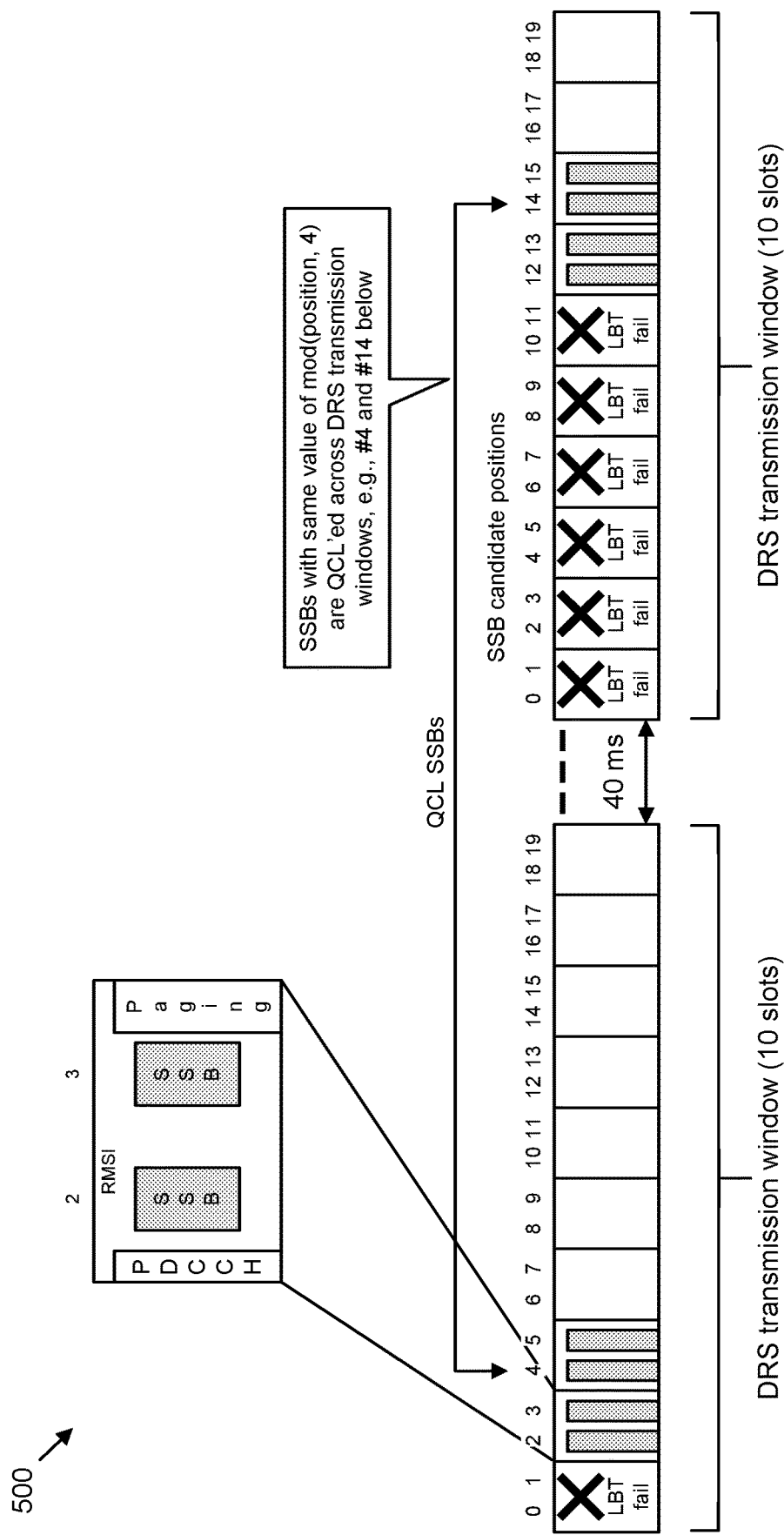
FIG. 5 is a diagram illustrating one embodiment of a sequence of DRS transmission windows with multiple SSB candidate positions.

FIG. 5 is a diagram illustrating a sequence 500 of DRS transmission windows with multiple SSB candidate positions for LBT flexibility. In the sequence 500, four SSBs are actually transmitted (i.e., two in each DRS transmission window). As depicted, a DRS transmission window may comprise 10 slots. Each slot has two SSB candidate positions. There may be a gap between successive DRS transmission windows. In the depicted embodiment, there is a 40 ms gap. SSBs with the same value of 'mod(position,4)' are considered quasi co-located across DRS transmission windows. Accordingly, SSB candidate position #4 in the first transmission window is QCL with the SSB candidate position #14 in the second transmission window.

In the depicted example, the RAN node 210 experiences LBT failure during the first slot of the first transmission window (corresponding to SSB transmission candidates 0-1). The RAN node 210 also experiences LBT failure during the first six slots of the second transmission window (corresponding to SSB transmission candidates 0-11).

Figure 6:
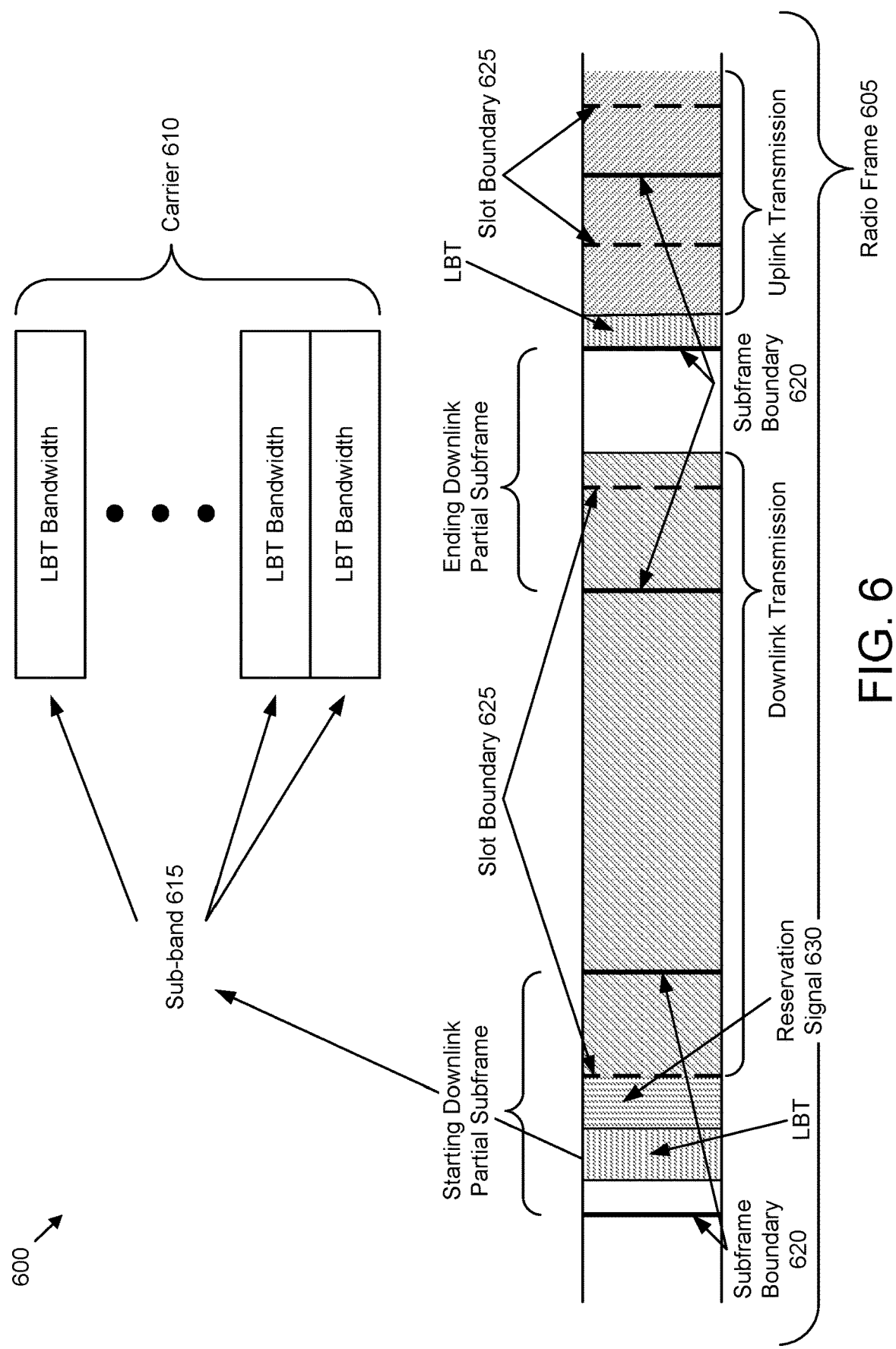
FIG. 6 is a diagram illustrating one embodiment of a radio frame during which LBT procedure is performed.

FIG. 6 depicts an LBT procedure 600 for a radio frame 605 for unlicensed communication, according to embodiments of the disclosure. When a communication channel is a wide bandwidth unlicensed carrier 610 (e.g., several hundred MHz, the CCA/LBT procedure relies on detecting the energy level on multiple sub-bands 615 of the communications channel as shown in FIG. 6. The LBT parameters (such as type/duration, clear channel assessment parameters, etc.) are configured in the UE 205 by the RAN node 210. In one embodiment, the LBT procedure is performed at the PHY layer 230. When performing omni-directional LBT, the entity (i.e., RAN node or UE) may use an omnidirectional sensing beam. Alternatively, the entity may simultaneously perform directional LBT using multiple beams (i.e., corresponding to multiple device panels) in order to simulate omnidirectional sensing. When performing directional LBT, the entity (i.e., RAN node or UE) performs LBT for a given beam (i.e., corresponding to a given spatial direction). Note that each directional beam may correspond to one or more device panels.

FIG. 6 also depicts frame structure of the radio frame 605 for unlicensed communication between the UE 205 and RAN node 210. The radio frame 605 may be divided into subframes (indicated by subframe boundaries 620) and may be further divided into slots (indicated by slot boundaries 625). The radio frame 605 uses a flexible arrangements where uplink and downlink operations are on the same frequency channel but are separated in time. However, the subframes are not configured as a downlink subframe or an uplink subframe and a particular subframe may be used by either the UE 205 or RAN node 210. As discussed previously, LBT is performed prior to a transmission. Where LBT does not coincide with a slot boundary 625, a reservation signal 630 may be transmitted to reserve (i.e., occupy) the channel until the slot boundary is reached and data transmission begins.

Figure 7:
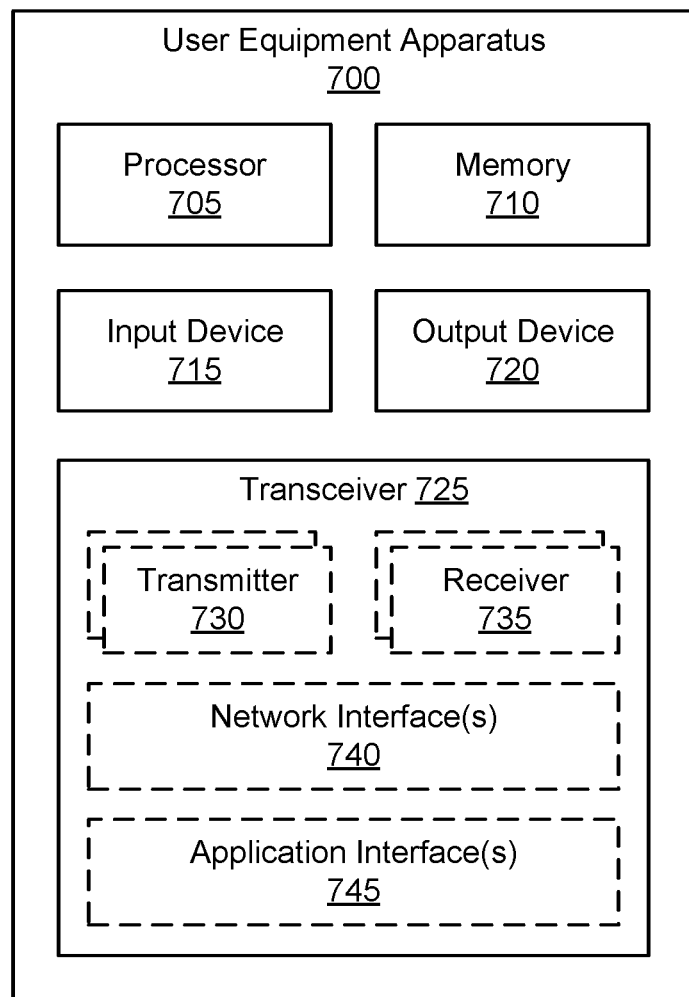
FIG. 7 is a diagram illustrating one embodiment of a user equipment apparatus that may be used for directional LBT procedure for DRS transmission.

FIG. 7 depicts a user equipment apparatus 700 that may be used for directional LBT procedure for DRS transmission, according to embodiments of the disclosure. In various embodiments, the user equipment apparatus 700 is used to implement one or more of the solutions described above. The user equipment apparatus 700 may be one embodiment of the remote unit 105 and/or the UE 205, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panels supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In certain embodiments, the processor 705 may include an application processor (also known as "main processor") which manages application-domain and operating system ("OS") functions and a baseband processor (also known as "baseband radio processor") which manages radio functions.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to directional LBT procedure for DRS transmission. For example, the memory 710 may store various parameters, panel/beam configurations, resource assignments, policies, and the like as described above. In certain embodiments, the memory 710 also stores program code and related data, such as an operating system or other controller algorithms operating on the apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
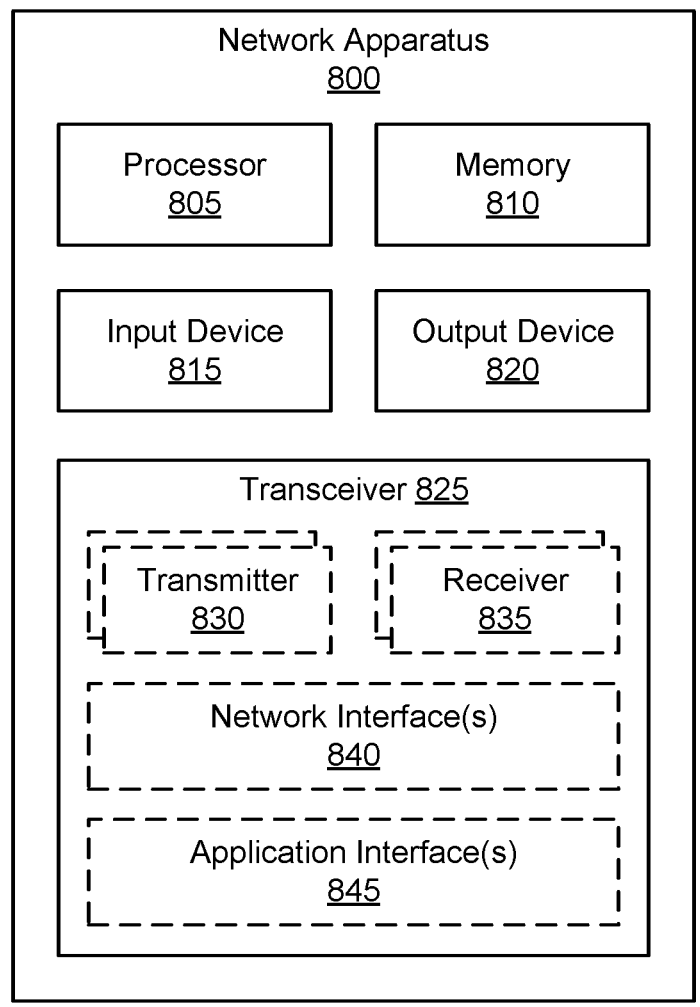
FIG. 8 is a diagram illustrating one embodiment of a network equipment apparatus that may be used for directional LBT procedure for DRS transmission.

FIG. 8 depicts a network equipment apparatus 800 that may be used for directional LBT procedure for DRS transmission, according to embodiments of the disclosure. In one embodiment, network equipment apparatus 800 may be one implementation of a RAN node, such as the base unit 121, the RAN node 210, or a gNB, as described above. Furthermore, the base network equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network equipment apparatus 800 may not include any input device 815 and/or output device 820. In various embodiments, the network equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the network equipment apparatus 800 is a RAN node (e.g., gNB) that performs Discover Reference Signal ("DRS") transmissions (i.e., transmits SS/PBCH block) during a DRS window, as described herein. In such embodiments, the processor 805 controls the network equipment apparatus 800 to perform the above described RAN behaviors. When operating as a RAN node, the processor 805 may include an application processor (also known as "main processor") which manages application-domain and operating system ("OS") functions and a baseband processor (also known as "baseband radio processor") which manages radio functions.

In various embodiments, the processor 805 indicates block locations within a DRS transmission window for a plurality of candidate SSBs. The processor 805 performs a Listen-Before-Talk ("LBT") procedure for a plurality of DRS transmissions within a DRS transmission window and—for a given spatial direction—controls the transceiver 825 to transmit a SSB upon successful LBT for the given spatial direction.

In some embodiments, the processor 805 controls the transceiver 825 to transmit a CORESET and CSI-RS with the SSB. In such embodiments, transmitting the SSB includes a beam-swept transmission of the SSB, the CORESET and the CSI-RS within a DRS transmission window.

In some embodiments, the processor 805 performs the LBT procedure by performing a plurality of directional LBT procedures at different time instances within the DRS window, each directional LBT procedure performed prior to a DRS transmission. In certain embodiments, the SSB is not transmitted if LBT fails for the given spatial direction. In certain embodiments, a channel occupancy duration of the each directional LBT channel access is less than or equal to a duration of the DRS transmission window. In other embodiments, a channel occupancy duration of the each directional LBT channel access is based on a number of quasi-co-located SSB transmissions to be performed in each spatial direction within the DRS transmission window.

In some embodiments, the processor 805 performs the LBT procedure by using omni-directional sensing to acquire a first COT. In such embodiments, the processor 805 may control the transceiver 825 to occupy the channel in the given spatial direction after successful LBT and prior to transmitting the SSB.

In some embodiments, the processor 805 performs the LBT procedure by simultaneously performing a plurality of directional LBT procedures at a same time instance to acquire a first COT. In such embodiments, performing the plurality of directional LBT procedures at a same time instance comprises using a category-4 ("Cat-4") LBT procedure to acquire a first COT. In certain embodiments, the processor 805 further performs a category-2 ("Cat-2") directional LBT procedure for the given spatial direction prior to actual DRS transmission.

In some embodiments, the processor 805 performs the LBT procedure at the beginning of a COT containing a DRS transmission window. In such embodiments, the processor 805 may perform data transmission to one or more connected UEs during a remaining COT. In other embodiments, the processor 805 shares a remaining COT with a UE. In some embodiments, the processor 805 controls the transceiver 825 to occupy the channel in the given spatial direction after successful LBT and prior to transmitting the SSB.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to directional LBT procedure for DRS transmission. For example, the memory 810 may store parameters, configurations, resource assignments, policies, and the like, as described above. In certain embodiments, the memory 810 also stores program code and related data, such as an operating system or other controller algorithms operating on the remote unit 85.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the PLMN and/or RAN, as described herein. Although only one transmitter 830 and one receiver 835 are illustrated, the network equipment apparatus 800 may have any suitable number of transmitters 830 and receivers 835. Further, the transmitter(s) 830 and the receiver(s) 835 may be any suitable type of transmitters and receivers.

The transceiver 825 is operable on unlicensed spectrum, wherein the transceiver 825 includes a plurality of gNB panels. As used herein, a "gNB panel" refers to a logical entity that may be mapped to physical gNB antennas. Depending on the implementation, a "gNB panel" can have an operational role of Unit of antenna group to control its Tx beam independently.

Figure 9:
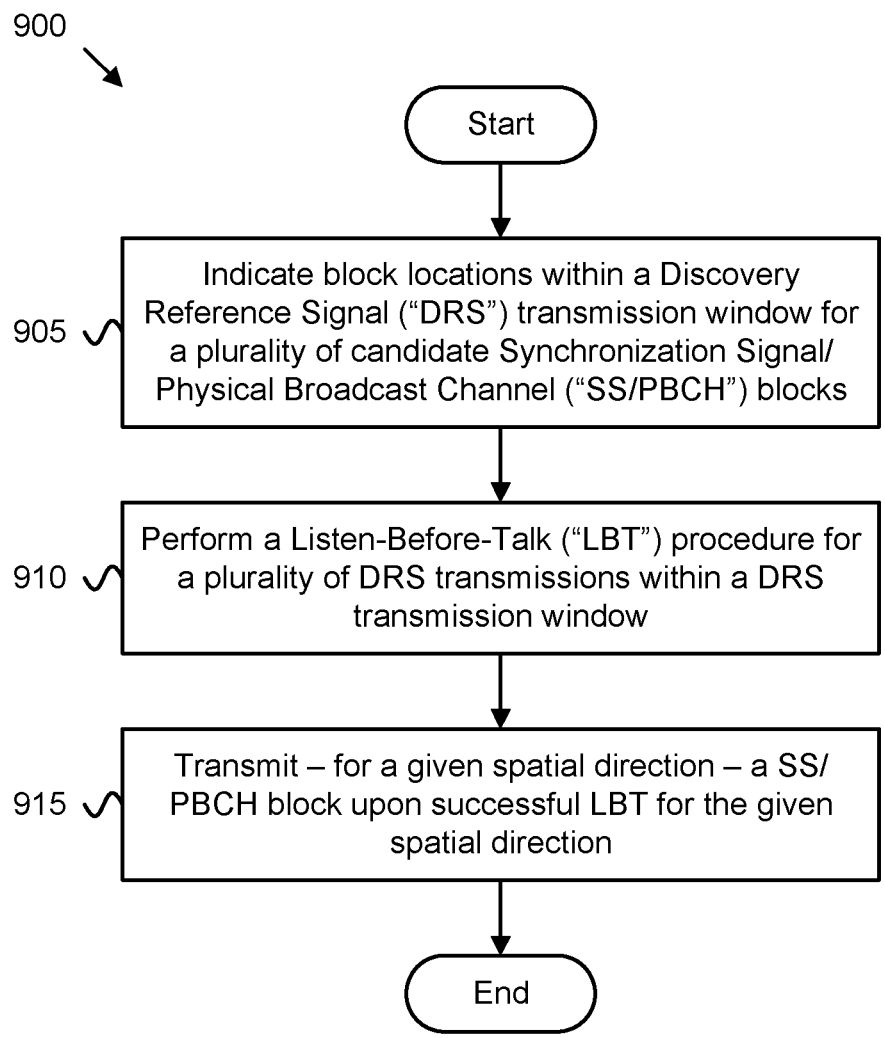
FIG. 9 is a flowchart diagram illustrating one embodiment of a method for directional LBT procedure for DRS transmission.

FIG. 9 depicts one embodiment of a method 900 for directional LBT procedure for DRS transmission, according to embodiments of the disclosure. In various embodiments, the method 900 is performed by a RAN node in a mobile communication network, such as the base unit 101, the RAN node 210, and/or the network apparatus 800, described above. In some embodiments, the method 900 is performed by a processor, such as a microcontroller, a microprocessor, a CPU, a GPU, an auxiliary processing unit, a FPGA, or the like.

The method 900 begins and indicates 905 block locations within a Discovery Reference Signal ("DRS") transmission window for a plurality of candidate Synchronization Signal/Physical Broadcast Channel ("SS/PBCH") blocks. The method 900 includes performing 910 a Listen-Before-Talk ("LBT") procedure for a plurality of DRS transmissions within a DRS transmission window. The method 900 includes transmitting 915—for a given spatial direction—a SS/PBCH block upon successful LBT for the given spatial direction. The method 900 ends.

Disclosed herein is a first apparatus for directional LBT procedure for DRS transmission, according to embodiments of the disclosure. The first apparatus may be implemented by a RAN node in a mobile communication network, such as the base unit 101, the RAN node 210, and/or the network apparatus 800, described above. The first apparatus includes a processor and a transceiver that is operable on unlicensed spectrum, wherein the transceiver includes a plurality of UE panels.

The processor indicates block locations within a Discovery Reference Signal ("DRS") transmission window for a plurality of candidate Synchronization Signal/Physical Broadcast Channel ("SS/PBCH") blocks. The processor performs a Listen-Before-Talk ("LBT") procedure for a plurality of DRS transmissions within a DRS transmission window and transmits—for a given spatial direction—a SS/PBCH block upon successful LBT for the given spatial direction.

In some embodiments, the processor controls the transceiver to transmit a Control Resource Set ("CORESET") and Channel State Information Reference Signal ("CSI-RS") with the SS/PBCH block. In such embodiments, transmitting the SS/PBCH block includes a beam-swept transmission of the SS/PBCH block, the CORESET and the CSI-RS within a DRS transmission window.

In some embodiments, the processor performs the LBT procedure by performing a plurality of directional LBT procedures at different time instances within the DRS window, each directional LBT procedure performed prior to a DRS transmission. In certain embodiments, the SS/PBCH block is not transmitted if LBT fails for the given spatial direction. In certain embodiments, a channel occupancy duration of the each directional LBT channel access is less than or equal to a duration of the DRS transmission window. In other embodiments, a channel occupancy duration of the each directional LBT channel access is based on a number of quasi-co-located SS/PBCH block transmissions to be performed in each spatial direction within the DRS transmission window.

In some embodiments, the processor performs the LBT procedure by using omni-directional sensing to acquire a first Channel Occupancy Time ("COT"). In such embodiments, the processor may control the transceiver to occupy the channel in the given spatial direction after successful LBT and prior to transmitting the SS/PBCH block.

In some embodiments, the processor performs the LBT procedure by simultaneously performing a plurality of directional LBT procedures at a same time instance to acquire a first COT. In such embodiments, performing the plurality of directional LBT procedures at a same time instance comprises using a Cat-4 LBT procedure to acquire a first COT. In certain embodiments, the processor further performs a Cat-2 directional LBT procedure for the given spatial direction prior to actual DRS transmission.

In some embodiments, the processor performs the LBT procedure at the beginning of a COT containing a DRS transmission window. In such embodiments, the processor may perform data transmission to one or more connected user equipment devices ("UEs") during a remaining COT. In other embodiments, the processor shares a remaining COT with a user equipment device ("UE"). In some embodiments, the processor controls the transceiver to occupy the channel in the given spatial direction after successful LBT and prior to transmitting the SS/PBCH block.

Disclosed herein is a first method for directional LBT procedure for DRS transmission, according to embodiments of the disclosure. The first method may be performed by a RAN node in a mobile communication network, such as the base unit 101, the RAN node 210, and/or the network apparatus 800. The first method includes indicating block locations within a DRS transmission window for a plurality of candidate SS/PBCH blocks ("SSBs"). The first method includes performing a LBT procedure for a plurality of DRS transmissions within a DRS transmission window. The first method includes transmitting—for a given spatial direction—a SS/PBCH block ("SSB") upon successful LBT for the given spatial direction.

In some embodiments, the first method includes transmitting a CORESET and CSI-RS with the SSB, wherein transmitting the SSB comprises a beam-swept transmission of the SSB, the CORESET and the CSI-RS within a DRS transmission window.

In some embodiments, performing the LBT procedure comprises performing a plurality of directional LBT procedures at different time instances within the DRS window, each directional LBT procedure performed prior to a DRS transmission. In various embodiments, the SSB is not transmitted if LBT fails for the given spatial direction. In certain embodiments, a channel occupancy duration of the each directional LBT channel access is less than or equal to a duration of the DRS transmission window. In certain embodiments, a channel occupancy duration of the each directional LBT channel access is based on a number of quasi-co-located SSB transmissions to be performed in each spatial direction within the DRS transmission window.

In some embodiments, performing the LBT procedure comprises using omni-directional sensing to acquire a first COT. In such embodiments, the first method may further include occupying the channel in the given spatial direction after successful LBT and prior to transmitting the SSB. In some embodiments, performing the LBT procedure occurs at the beginning of a COT containing a DRS transmission window. In certain embodiments, the first method may further include performing data transmission to one or more connected UEs during a remaining COT.

In some embodiments, performing the LBT procedure comprises simultaneously performing a plurality of directional LBT procedures at a same time instance to acquire a first COT. In such embodiments, performing the plurality of directional LBT procedures at a same time instance may include using a Cat-4 LBT procedure to acquire a first COT. In certain embodiments, the first method further includes performing a Cat-2 directional LBT procedure for the given spatial direction prior to actual DRS transmission.

In some embodiments, performing the LBT procedure occurs at the beginning of a COT containing a DRS transmission window. In such embodiments, the first method may further include sharing a remaining COT with a UE. In some embodiments, the first method includes occupying the channel in the given spatial direction after successful LBT and prior to transmitting the SSB.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
    transmitting an indication of one or more block locations within a Discovery Reference Signal ("DRS") transmission window for a plurality of candidate Synchronization Signal and Physical Broadcast Channel ("SS/PBCH") blocks;
    performing a Listen-Before-Talk ("LBT") procedure for a plurality of DRS transmissions within the DRS transmission window; and
    transmitting—for a given spatial direction—an SS/PBCH block, a Control Resource Set ("CORESET"), and Channel State Information Reference Signal ("CSI-RS") based on a successful LBT for the given spatial direction.

2. The method of claim 1, wherein transmitting the SS/PBCH block comprises a beam-swept transmission of the SS/PBCH block, the CORESET and the CSI-RS within the DRS transmission window.

3. The method of claim 1, wherein performing the LBT procedure comprises performing a plurality of directional LBT procedures at different time instances within the DRS window, each directional LBT procedure performed prior to a DRS transmission.

4. The method of claim 3, where the SS/PBCH block is not transmitted based on an unsuccessful LBT for the given spatial direction.

5. The method of claim 3, wherein a channel occupancy duration of each directional LBT channel access is less than or equal to a duration of the DRS transmission window.

6. The method of claim 3, wherein a channel occupancy duration of each directional LBT channel access is based on a number of quasi-co-located SS/PBCH block transmissions to be performed in each spatial direction within the DRS transmission window.

7. The method of claim 1, wherein performing the LBT procedure comprises using omni-directional sensing to acquire a first Channel Occupancy Time ("COT"), the method further comprising occupying a channel in the given spatial direction after successful LBT and prior to transmitting the SS/PBCH block.

8. The method of claim 1, wherein performing the LBT procedure comprises simultaneously performing a plurality of directional LBT procedures at a same time instance to acquire a first Channel Occupancy Time ("COT").

9. The method of claim 8, wherein performing the plurality of directional LBT procedures at a same time instance comprises using a category-4 ("Cat-4") LBT procedure to acquire a first Channel Occupancy Time ("COT"), the method further comprising performing a category-2 ("Cat-2") directional LBT procedure for the given spatial direction prior to actual DRS transmission.

10. The method of claim 1, wherein performing the LBT procedure occurs at the beginning of a Channel Occupancy Time ("COT") containing the DRS transmission window, the method further comprising performing data transmission to one or more user equipment ("UEs") during a remaining COT.

11. The method of claim 1, wherein performing the LBT procedure occurs at the beginning of a Channel Occupancy Time ("COT") containing the DRS transmission window, the method further comprising sharing a remaining COT with a user equipment ("UE").

12. The method of claim 1, further comprising occupying a channel in the given spatial direction after successful LBT and prior to transmitting the SS/PBCH block.

13. A base station for wireless communication, comprising:
    at least one memory; and
    at least one processor coupled with the at least one memory and configured to cause the base station to:
    transmit an indication of one or more block locations within a Discovery Reference Signal ("DRS") transmission window for a plurality of candidate Synchronization Signal and Physical Broadcast Channel ("SS/PBCH") blocks;
    performs a Listen-Before-Talk ("LBT") procedure for a plurality of DRS transmissions within the DRS transmission window; and
    transmits—for a given spatial direction—an SS/PBCH block, a Control Resource Set ("CORESET"), and Channel State Information Reference Signal ("CSI-RS") based on a successful LBT for the given spatial direction.

14. The base station of claim 13, wherein transmitting the SS/PBCH block comprises a beam-swept transmission of the SS/PBCH block, the CORESET and the CSI-RS within the DRS transmission window.

15. The base station of claim 13, wherein performing the LBT procedure comprises performing a plurality of directional LBT procedures at different time instances within the DRS window, each directional LBT procedure performed prior to a DRS transmission.

16. The base station of claim 15, where the SS/PBCH block is not transmitted based on an unsuccessful LBT for the given spatial direction.

17. The base station of claim 15, wherein a channel occupancy duration of each directional LBT channel access is less than or equal to a duration of the DRS transmission window.

18. The base station of claim 13, wherein the processor perform the LBT procedure using omni-directional sensing to acquire a first Channel Occupancy Time ("COT"), wherein the at least one processor coupled with the at least one memory is configured to occupy a channel in the given spatial direction after successful LBT and prior to transmitting the SS/PBCH block.

19. The base station of claim 13, wherein performing the LBT procedure comprises simultaneously performing a plurality of directional LBT procedures at a same time instance to acquire a first Channel Occupancy Time ("COT").

20. The base station of claim 19, wherein performing the plurality of directional LBT procedures at a same time instance comprises using a category-4 ("Cat-4") LBT procedure to acquire a first Channel Occupancy Time ("COT"), wherein the at least one processor is configured to cause the base station to perform a category-2 ("Cat-2") directional LBT procedure for the given spatial direction prior to actual DRS transmission.

* * * * *